(No Model.)
T. A. EDISON.
SYSTEM OF ELECTRICAL DISTRIBUTION.
No. 438,308. Patented Oct. 14, 1890.
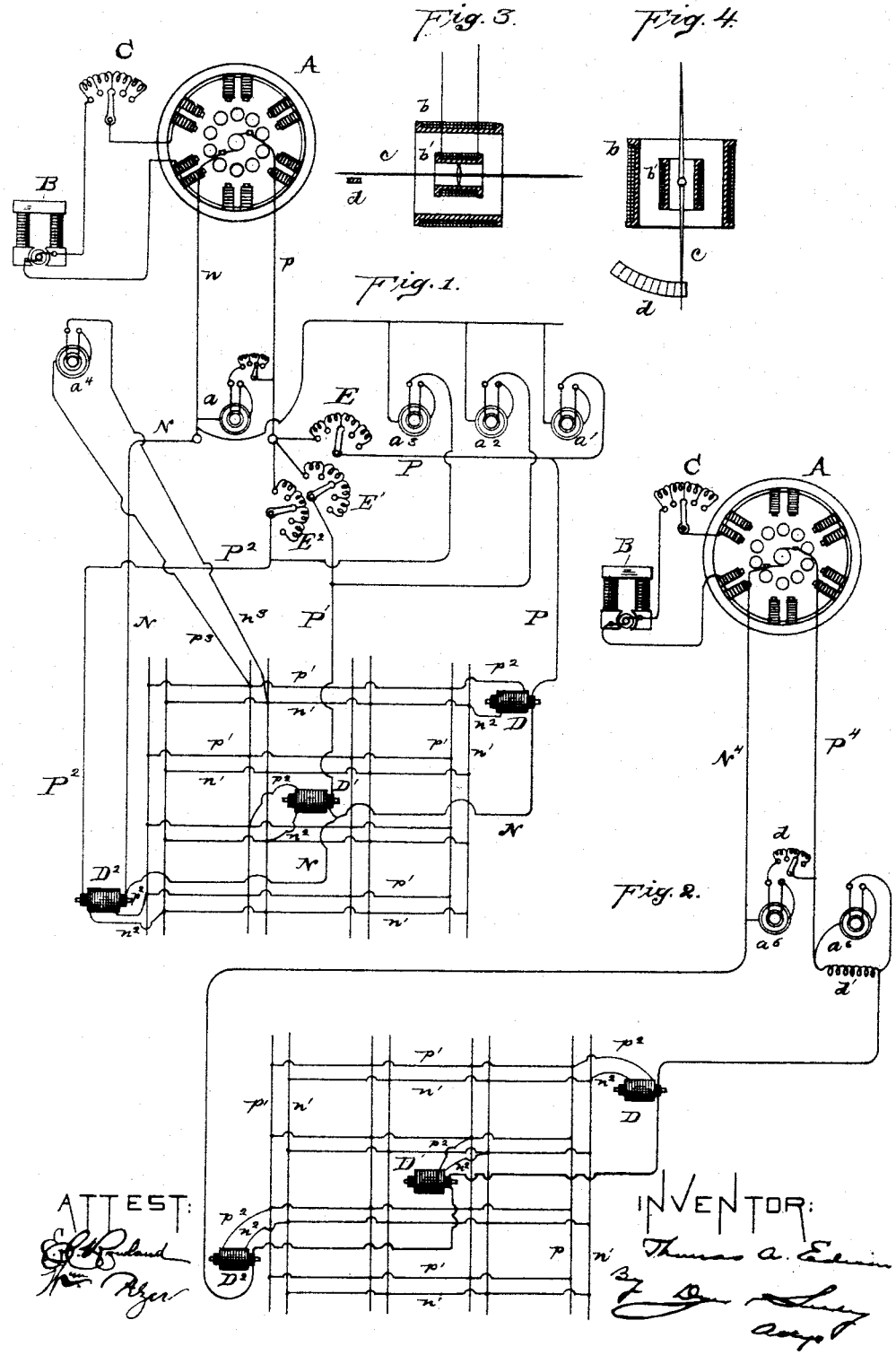

UNITED STATES PATENT OFFICE.

THOMAS A. EDISON, OF LLEWELLYN PARK, NEW JERSEY.

SYSTEM OF ELECTRICAL DISTRIBUTION.

SPECIFICATION forming part of Letters Patent No. 438,308, dated October 14, 1890.

Application filed December 6, 1886. Serial No. 220,792. (No model.)

*To all whom it may concern:*

Be it known that I, THOMAS A. EDISON, of Llewellyn Park, in the county of Essex and State of New Jersey, have invented a certain new and useful Improvement in Systems of Electrical Distribution, (Case No. 691,) of which the following is a specification.

My invention relates to multiple-arc systems of electrical distribution, in which alternating-current generators are used, in connection with converters, for supplying current to and other transmitting devices, and especially to the combination, with such a system, of a current-indicating device of the character hereinafter described and claimed.

My invention is illustrated in the accompanying drawings, in which—

Figure 1 is a diagram of a system of electrical distribution embodying said invention with the converter primaries in multiple arc on separate circuits from the same source; Fig. 2, a diagram of the system with the converters in series on the same circuit, and Figs. 3 and 4 are sectional views of the indicating device which I prefer to employ.

A represents an alternating-current dynamo-electric machine generating current of high electro-motive force, one or more of which machines form the source of current.

B is a continuous-current generator energizing the field-magnets of the alternating machine and having an adjustable resistance C in its circuit, by adjusting which the field-magnet strength of the alternating machine and the electro-motive force thereof are regulated.

Referring more especially to Fig. 1, conductors $p$ $n$ extend from the commutator-brushes to suitable terminal points within the generating-station. From the terminal of conductor $p$ conductors P, P', and P$^2$ extend, and from the terminal of conductor $n$ a conductor N extends. The system of intersecting and connected positive and negative main or lighting conductors is represented by $p'$ $n'$.

D, D', and D$^2$ are converters.

I have shown induction-coils of ordinary form, which are efficient for the purpose of my invention. I may, however, use induction devices having cores of ring form and built up of thin plates or bundles of wire, as is common in the armatures of dynamo-electric machines, this construction being useful for the prevention of Foucault currents in the core and for giving greater efficiency in conversion. Such converters are set forth in my application, Serial No. 219,358, filed November 19, 1886, and therefore are not illustrated herein, the simple form of induction-coil being shown to illustrate the principle of the invention.

The conductor P extends to the primary of converter D, conductor P' extends to that of converter D', and conductor P$^2$ extends to that of converter D$^2$. The opposite terminals of all the primary circuits are connected with conductor N, which therefore forms a common return for all the multiple-arc primaries. It is evident that separate return-conductors may be provided, if desired. The converters are placed at or near the centers of consumption of the district supplied. From their secondary circuits conductors $p^2$ and $n^2$ extend, which are connected with the intersecting positive and negative main conductors $p'$ $n'$. Connected across the conductors $p$ $n$ is an indicator $a$ of pressure or electro-motive force, and connected across each of the circuits P N, P' N, and P$^2$ N are similar indicators $a'$, $a^2$, and $a^3$. These indicators are adapted to indicate electro-motive force in an alternating-current circuit, and are shown more in detail in Figs. 3 and 4. Each consists of two coils $b$ and $b'$, the latter suspended within the former and both connected in the same circuit in series. Since upon the passage of current the inner coil tends to set itself at right angles to the outer one, any increase or decrease of current due to changes of potential in the conductors across which the indicators are connected acts to change the position of said inner coil, and since this is provided with a pointer $c$, traveling upon a scale $d$, such changes of potential are constantly indicated, and since the coils are in the same circuit change in direction of current does not affect the movements of the indicating-coil, for which reason these instruments are well adapted to be used in a system employing alternating or reversed currents.

The indicator $a$ indicates the pressure or electro-motive force at the source, and by adjusting the resistance C in accordance with these indications this pressure is kept constant. The indicators $a'$, $a^2$, and $a^3$ show the pressure in each of the feeding-circuits, and such circuits are regulated to maintain the same constant pressure at all parts of the system by adjusting the resistances E, E', and $E^2$, situated in the conductors P, P', and $P^2$. A circuit $p^3$ $n^3$ of small wires may extend back from the district at a suitable point to the station, where it is connected with an indicator $a^4$ to show the general reduced pressure on the system of lighting-conductors, whereby any derangement in the action of the converters may be shown.

The conductors P, P', $P^2$, and N are of small size, being required to convey the high-tension current. This current is reduced by the converters, and the short conductors which connect the secondary coils with the main conductors are of larger size. The economy in the amount of metal used for conductors which results from this arrangement is evident.

In the arrangement shown in Fig. 2 a single circuit $P^4$ $N^4$ extends from the high-tension source of supply, and the primaries of all the induction-coils D, D', and $D^2$ are placed in series therein, the secondary circuits thereof being connected with the main or lighting conductors, as before. The indicator $a^5$, of the character already described, is connected across the line, having a resistance $d$ in circuit with it. This indicates the volts of electro-motive force. A similar indicator $a^6$, shunted around a resistance $d''$ in the line, indicates the ampères of current. The regulation is accomplished by the resistance C in the field-circuit of the generator.

What I claim is—

1. In a system of electrical distribution, the combination of a high-tension alternating-current generator, a circuit extending therefrom, a converter connected with said circuit and supplying current to translating devices, and an electrical indicator not affected by changes in polarity connected with one coil or circuit of the connector, substantially as described.

2. In a system of electrical distribution, the combination of a high-tension alternating-current generator, a circuit extending therefrom, a tension-reducing converter connected with said circuit and supplying a current of reduced tension to translating devices, and an electrical indicator not affected by changes in polarity connected with the high-tension circuit, substantially as set forth.

3. In a system of electrical distribution, the combination of a high-tension alternating-current generator, a circuit extending therefrom, a tension-reducing converter connected with said circuit and supplying a current of reduced tension to translating devices, and an electrical indicator having two relatively-movable coils in the same circuit connected with said high-tension circuit, substantially as set forth.

This specification signed and witnessed this 9th day of November, 1886.

THOS. A. EDISON.

Witnesses:
WM. PELZER,
E. C. ROWLAND.

It is hereby certified that in Letters Patent No. 438,308, granted October 14, 1890, upon the application of Thomas A. Edison, of Llewellyn Park, New Jersey, for an improvement in "Systems of Electrical Distribution," an error appears in the printed specification requiring correction, as follows: In line 50, page 2, the word "connector" should read *converter;* and that the Letters Patent should be read with this correction therein that the same may conform to the record of the case in the Patent Office.

Signed, countersigned, and sealed this 25th day of November, A. D. 1890.

[SEAL.]

CYRUS BUSSEY,
*Assistant Secretary of the Interior.*

Countersigned:
   C. E. MITCHELL,
      *Commissioner of Patents.*